3,190,851
PROCESS FOR PRODUCTION OF HOMOGENEOUS RUBBER-SILICIC ACID MIXTURES
Günther Maass, Marl, Kreis Recklinghausen, and Paul Bernemann, Haltern, Westphalia, Germany, assignors to Chemische Werke Huls Aktiengesellschaft, Marl, Kreis Recklinghausen, Germany, a corporation of Germany
No Drawing. Filed Mar. 30, 1962, Ser. No. 183,744
Claims priority, application Germany, Aug. 21, 1961, C 24,917
1 Claim. (Cl. 260—41.5)

It has already been proposed to produce homogeneous rubber-silicic acid mixtures from synthetic rubber lactices and water glass dispersions by precipitation by means of acids in the presence of electrolytes under certain concentration conditions, precipitating times and temperatures. Such mixtures, however, have the drawback that they do not yield transparent test bodies by vulcanization with a so-called transparence recipe. The lack of transparency of the test bodies becomes greater the higher the silicic acid content of the mixture. In the particularly common mixture ratio of 100 parts rubber to 50 parts silicic acid, even 1 mm. thick test bodies are completely opaque.

It has been found that rubber-silicic acid mixtures which are transparent after vulcanization can be prepared from rubber latices and water glass dispersions by precipitation with acids in the presence of neutral electrolytes if one precipitates at rubber concentrations in the starting dispersion of less than 100 g./l., preferably less than 70 g./l. The electrolyte concentration should expediently be smaller than 55 g./l. and is dependent in the already known manner on the remaining precipitating conditions.

From the following table can be seen the concentrations required for the preparation of a homogeneous, transparent rubber-silicic acid mixture in the weight ratio 100:50. The rubber concentration in the starting dispersion is 40 g./l. in all cases, the silicic acid concentration accordingly is 20 g./l.

|     | NaCl Concentration, g./l. | Precipitation Time, minutes pH 9–7 | Temperature, °C. |
| --- | --- | --- | --- |
| (1) | 50 | 10 | 20 |
| (2) | 40 | 40 | 20 |
| (3) | 32 | 60 | 17 |
| (4) | 25 | 60 | 5 |
| (5) | 25 | 60 | 20 |

The processing of these precipitates can be carried out in known manner, that is, after the pH of 9 to 7 is reached, the suspension is heated and subsequently adjusted with additional acid to a pH of 3 to 2. In case 1 the coagulate can be freed from the salts by suction filtration and slurrying in water; in cases 2, 3 and 4 one expediently washes the filtered precipitate on the filter (suction filter, turning-cell filter, etc). Only in case 5 is a filtration carried out at the pH of 9 to 7, the filter cake is dried, distintegrated, slurried in the motor liquor, adjusted with acid to pH 3 to 2, filtered and washed.

A transparence recipe, according to which the rubber-silicic acid mixtures can be tested, is reproduced in the following. But it is also possible to test according to similar recipes, which are customary in the technology.

|                                      | Parts by weight |
| --- | --- |
| Rubber-silicic acid mixture          | 150 |
| Stearic acid                         | 1 |
| Zinc oxide                           | 3 |
| Sulfur                               | 2 |
| Zinc salt of 2 mercaptobenzothiazol  | 1.75 |
| Diphenylguanidine                    | 1.75 |
| Hexamethylenetetramine               | 1 |

The mixtures are heated at 150° C. for 60 minutes.

The transparency can be evaluated simply by placing the test bodies on a standard typewritten sheet. The writing can still be read under a layer thickness of several mm. through transparent test bodies.

Aqueous oil emulsions can be added to the starting dispersions. The mixtures can be produced continuously.

Suitable lactices are, for example, dispersions of mixed polymerides of diolefins, such as butadiene; and mono-olefins, such as styrene, acrylonitrile, acrylic acid ester, etc. The latices may contain a dispersing agent and must have an emulsifier-disperser system which is stable only in the alkaline pH range and loses its emulsifying capacity upon passage into the acid pH range, so that the latex coagulates.

It is a further advantage of the method of the present invention that homogeneous rubber-silicic acid mixtures can be prepared even from latices which contain as emulsifiers exclusively or at least more than 75% of the salts of resin acids known by the commercial name "Dresinate" and therefore, do not give a stable cream upon the addition of neutral electrolytes.

The difference of the resin acid salt from the mixed emulsifier latices is particularly striking in the following numerical example.

In the preparation of a rubber-silicic acid mixture in the ratio of 100 parts by weight of rubber to 50 parts by weight of silicic acid at a temperature of 20° C. and a precipitating time of 10 to 20 minutes to the approximate neutrality point (pH 7 to 9) one chooses the following concentrations in the starting dispersion:

With a mixed emulsifier latex:

60 g. NaCl/l
120 g. rubber/l
60 g. SiO$_2$/l

With a latex with resin acid salt as emulsifier:

60 g. NaCl/l
60 g. rubber/l
30 g. SiO$_2$/l

This means that in the second case twice the amount of electrolyte, referred to rubber, is present. It is especially surprising that with these quantities of electrolyte a homogeneous mixture of rubber and silicic acid is obtained, although the latex is not creamable with electrolyte solutions.

The cited concentrations in the starting dispersion are calculated as follows:

The rubber concentration is given in grams of solid substance in the latex used in forming the dispersion per liter of dispersion. The SiO$_2$ concentration is the amount of SiO$_2$ in grams in the alkali metal silicate solution used in forming the dispersion per liter of dispersion.

The preparation of the rubber-silicic acid mixtures should expediently occur in such a way that the least possible amounts of heavy metal salts, particularly iron salts, are present in the mixture. Expediently, one therefore starts with such latices whose polymerization recipe contains only small amounts of iron. However, latices with larger amounts of iron can also be used. The latter generally show a brown coloration of the test pieces.

*Example 1*

3460 g. of a synthetic rubber latex with a solids content of 21.7% where the solid substance consists of a mixed polymeride of 76 parts butadiene and 24 parts styrene, are mixed with 11,580 g. of water and 1430 g. of sodium water glass having a density of 1.348 and a $SiO_2$ content of 26.2%, and the resulting mixture is mixed within 1 minute with intense stirring with 3000 g. of a 20% table salt solution. The concentrations in this cream are: 32 g. NaCl/l, 20 g. $SiO_2$/l, 40 g. rubber/l. Subsequently, 1750 ml. 1.5 N hydrochloric acid are introduced into the cream through a nozzle within 63 minutes at 16.5 to 17.5° C. while stirring intensively. A pH of 8 is attained. The suspension is heated to 90° C. and kept at this temperature for 10 minutes. Subsequently, it is adjusted with an additional 850 ml. of 1.5 N hydrochloric acid to a pH of 3. The finely divided product is suction filtered, washed on a suction filter and dried in a drying oven for 24 hours at 80° C. After the drying the mixture has an $SiO_2$ content of 32.0% and 2.15% water, determined by drying at 140° C. After vulcanization with the above transparence recipe, a test sample is clearly transparent at 6 mm. thickness.

*Example 2*

692 g. of the latex used in Example 1, 2185 g. water and 286 g. sodium water glass having a density of 1.348 and a $SiO_2$ content of 26.2% are mixed and reacted within 1 minute with 750 g. of 20% NaCl solution. The concentrations in this starting dispersion are: 40 g. NaCl/l, 20 g. $SiO_2$/l, 40 g. rubber/l. This cream is adjusted to a pH of 8 at 19° C. within 10 minutes by means of 360 ml. of 1.5 N hydrochloric acid, with stirring, is then heated up to 90° C., left at 90° C. for 10 minutes and subsequently brought to a pH of 3 with additional acid. The suspension is filtered, the filter cake dried, disintegrated and washed salt-free with hot water. After repeated drying the mixture contains 31.55% $SiO_2$. After vulcanization with the above transperance recipe, a test sample is obtained which is still clearly transparent at 5 mm. thickness.

*Example 3*

3180 g. of a non-creamable synthetic rubber latex formed of 76 parts butadiene and 24 parts styrene with a solids content of 23.6% and containing 8% sodium salt of a disproportionated resin acid, referred to the solid substance content, as the emulsifier, are mixed with 4902.5 ml. water and 1077.5 ml. sodium water glass ($SiO_2$ content 25.8%). Subsequently 3270 ml. 20% sodium chloride solution are stirred in within 1 minute. The concentrations in the starting dispersion then amount to 60 g. sodium chloride/l, 30 g. $SiO_2$/l and 60 g. rubber/l.

1800 ml. of 1.5 N $H_2SO_4$ are then introduced through a nozzle during vigorous stirring at 18 to 20° C. within 12 minutes. The pH value of this mixture is 8. The suspension is heated to 90° C., kept at this temperature for 10 minutes and subsequently adjusted to pH 3 with additional acid. The finely divided suspension is filtered, and the solids collected on the filter are washed repeatedly with water and subsequently dried at 80° C. Silicic acid content of the mixture 32.7%, water content 0.95%.

We claim:

Process for the production of a homogeneous rubber-silicic acid mixture which comprises mixing hydrochloric acid with a mixture of a sodium silicate solution and a latex of a mixed polymeride of a diolefine and a monoolefine, said mixture of sodium silicate solution and latex containing from 25 to 60 g. per liter of sodium chloride and from 40 to 70 g. per liter of rubber, and separating, washing and drying the resulting precipitate.

References Cited by the Examiner

UNITED STATES PATENTS

| 2,485,287 | 10/49 | Henson et al. | 260—41 |
| 2,560,043 | 7/51 | Schmidt | 260—41.5 |
| 3,034,914 | 5/62 | Lagerstrom | 106—288 |

FOREIGN PATENTS

| 598,701 | 5/60 | Canada. |

MORRIS LIEBMAN, *Primary Examiner.*